(12) United States Patent
Baek et al.

(10) Patent No.: US 10,030,549 B2
(45) Date of Patent: Jul. 24, 2018

(54) CONTINUOUS VARIABLE VALVE TIMING CONTROL DEVICE AND CONTROL METHOD THEREFOR

(71) Applicant: HYUNDAI KEFICO CORPORATION, Gunpo, Gyeonggi-do (KR)

(72) Inventors: Jin Wook Baek, Gyeonggi-do (KR); Nam Kyu Kim, Seoul (KR); Jong Rim Lee, Seoul (KR); Kyoung Ho Cho, Seoul (KR)

(73) Assignee: HYUNDAI KEFICO CORPORATION, Gunpo, Gyeonggi-do (KR)

( * ) Notice: Subject to any disclaimer, the term of this patent is extended or adjusted under 35 U.S.C. 154(b) by 106 days.

(21) Appl. No.: 15/299,115

(22) Filed: Oct. 20, 2016

(65) Prior Publication Data

US 2017/0037745 A1    Feb. 9, 2017

Related U.S. Application Data

(63) Continuation of application No. PCT/KR2015/004861, filed on May 14, 2015.

(30) Foreign Application Priority Data

May 15, 2014 (KR) .................. 10-2014-0058386

(51) Int. Cl.
*F01L 1/344* (2006.01)
*F01L 1/34* (2006.01)
(Continued)

(52) U.S. Cl.
CPC .......... *F01L 1/344* (2013.01); *F01L 1/34* (2013.01); *F01L 1/352* (2013.01);
(Continued)

(58) Field of Classification Search
CPC .......... F01L 1/344; F01L 2013/103; F01L 2013/111; F01L 2013/113; F01L 2201/00;
(Continued)

(56) References Cited

U.S. PATENT DOCUMENTS

2008/0065307 A1* 3/2008 Tanaka ................ F01L 1/352
                                                    701/102
2008/0081702 A1   4/2008 Tanaka et al.
(Continued)

FOREIGN PATENT DOCUMENTS

JP    2003-189666 A    7/2003
JP    2006-200387 A    8/2006
(Continued)

*Primary Examiner* — Jorge Leon, Jr.
(74) *Attorney, Agent, or Firm* — Mintz Levin Cohn Ferris Glovsky and Popeo, P.C.; Kongsik Kim

(57) ABSTRACT

A continuously variable valve timing (CVVT) control device is provided. The CVVT control device includes an engine controlling unit (ECU) configured to output an actual phase angle and a target phase angle of an intake valve or an exhaust valve. The CVVT control device further includes an intellectual motor controller configured to receive the actual phase angle and the target phase angle from the ECU through digital communication in a vehicle. A driving current is generated for adjusting an output torque of a motor based on a phase deviation between the received actual phase angle and target phase angle.

15 Claims, 6 Drawing Sheets

(51) Int. Cl.
*F02D 13/02* (2006.01)
*F02D 41/26* (2006.01)
*H04L 12/64* (2006.01)
*F01L 1/352* (2006.01)
*H04L 12/413* (2006.01)
*F01L 13/00* (2006.01)
*H04B 1/16* (2006.01)
*H04L 12/46* (2006.01)
*F02D 41/00* (2006.01)

(52) U.S. Cl.
CPC ......... *F02D 13/0219* (2013.01); *F02D 41/26* (2013.01); *F02D 41/266* (2013.01); *H04L 12/413* (2013.01); *H04L 12/6418* (2013.01); *F01L 2013/103* (2013.01); *F01L 2013/111* (2013.01); *F01L 2013/113* (2013.01); *F01L 2201/00* (2013.01); *F01L 2800/14* (2013.01); *F01L 2820/032* (2013.01); *F01L 2820/041* (2013.01); *F01L 2820/042* (2013.01); *F02D 41/009* (2013.01); *F02D 2041/001* (2013.01); *H04B 1/16* (2013.01); *H04L 12/46* (2013.01); *Y02T 10/18* (2013.01)

(58) Field of Classification Search
CPC ............. F01L 2800/14; F01L 2820/032; F01L 2820/041; F01L 2820/042

USPC .......................................... 123/90.15, 90.31
See application file for complete search history.

(56) References Cited

U.S. PATENT DOCUMENTS

| | | | |
|---|---|---|---|
| 2009/0058344 A1* | 3/2009 | Morino | F01L 1/34 318/599 |
| 2010/0012061 A1* | 1/2010 | Mashiki | F01L 1/344 123/90.17 |
| 2010/0145592 A1 | 6/2010 | Yoo | |
| 2010/0180844 A1* | 7/2010 | Uehama | F01L 1/022 123/90.17 |
| 2012/0143475 A1 | 6/2012 | Ryoo et al. | |
| 2015/0039168 A1* | 2/2015 | Kamatani | B60K 6/445 701/22 |

FOREIGN PATENT DOCUMENTS

| | | |
|---|---|---|
| JP | 2007-247430 A | 9/2007 |
| JP | 2008-057370 A | 3/2008 |
| KR | 10-0649355 B1 | 11/2006 |
| KR | 10-2010-0064919 A | 6/2010 |
| KR | 10-2012-0059982 A | 6/2012 |

* cited by examiner

CONTINUOUS VARIABLE VALVE TIMING CONTROL DEVICE AND CONTROL METHOD THEREFOR

CROSS-REFERENCE TO RELATED APPLICATIONS

This is a continuation application of International Application No. PCT/KR2015/004861 filed May 14, 2015, which claims priority to Korean Application No. 10-2014-0058386 filed May 15, 2014. The applications are incorporated herein by reference.

BACKGROUND

Field of the Invention

The present invention relates to a continuously variable valve timing (CVVT) control device and method, and more particularly, to a CVVT control device and method using a motor.

Description of the Related Art

Typically, automotive engineering, technology (hereinafter referred to as VVT control technology) that controls a variable valve timing (VVT) describes adjusting an opening and closing timing of a valve based on revolutions of an engine. Since the VVT control technology adjusts a valve opening and closing timing based on a low-speed rotation and a high-speed rotation of an engine, vehicles that include the VVT control technology have improved fuel efficiency and output.

Generally, in engines, the valve opening and closing timing obtains a maximum output in a specific rotation band (e.g., a specific RPM period). In other words, in a low RPM band where revolutions of an engine are low, the valve opening and closing timing is delayed in a power stroke which occurs in a combustion chamber of the engine. Further, in a high RPM band where the revolutions of the engine are high, the valve opening and closing timing is advanced for quickly emitting an exhaust gas in an exhaust stroke which occurs in the combustion chamber of the engine.

When the valve opening and closing timing is continuously controlled, the combustion chamber of the engine delays the emission of the exhaust gas. When the valve opening and closing timing is controlled at a high speed, a compression stroke which occurs in the combustion chamber of the engine is delayed and an efficiency of the engine is reduced. In order to solve such problems, the VVT control technology has been proposed. In particular, the VVT control technology controls the valve opening and closing timing based on revolutions of an engine. Accordingly, high fuel efficiency and a high output in a low-speed rotation band and a high-speed rotation band of the engine are attained.

In particular, a method of changing a valve opening and closing timing based on the VVT technology includes a method based on two steps including a low-speed rotation and a high-speed rotation, however, continuously variable valve timing (CVVT) technology for continuously adjusting the valve opening and closing timing has been developed. The CVVT technology includes technology that continuously adjusts the valve opening and closing timing based on revolutions of an engine and a degree to which an accelerator is opened.

A system for implementing the CVVT technology fundamentally includes an internal chamber coupled to a camshaft, an external system that is coupled to a timing system and includes a chain and a belt and is supplied with power from an engine, a sensor is configured to measure a current timing and a control device. The control device includes an oil control valve (OCV) by using hydraulics. Recently, a control method based on an electric motor has been developed to provide improved response characteristic. In a CVVT system, an engine controlling unit (ECU) included in vehicles is configured to receive the number of rotations of a camshaft from a sensor disposed in the camshaft, is configured to receive the number of rotations of a crank from a crankshaft, configured to calculate a current phase based on the received numbers of rotations, and calculates various command values for adjusting the performance of an electric motor. However, in the CVVT system, the ECU performs a logic operation for controlling the electric motor. In particular, the ECU that performs a number of operations, the logic operation for controlling the electric motor is a factor that increases an operation load. For this reason, the operation load causes an operation error of the ECU and a processing speed of the ECU is reduced.

SUMMARY

The present invention provides a CVVT control device and method which decrease an operation load performed by an ECU for controlling a CVVT. In one general aspect, a continuously variable valve timing (CVVT) control device may include an engine controlling unit (ECU) configured to output an actual phase angle and a target phase angle of an intake valve or an exhaust valve and an intellectual motor controller configured to receive the actual phase angle and the target phase angle from the ECU through digital communication in a vehicle. A driving current may be generated to adjust an output torque of a motor based on a phase deviation between the received actual phase angle and target phase angle.

In another exemplary embodiment, a continuously variable valve timing (CVVT) control device may include an engine controlling unit (ECU) that may be configured to output a target phase angle of an intake valve or an exhaust valve and an intellectual motor controller that may be configured to receive the target phase angle from the ECU through digital communication in a vehicle. An actual phase angle may be calculated based on a crank angle signal received from a crankshaft position sensor that may be configured to sense a rotation speed of the crankshaft. A cam angle signal may be received from a camshaft position sensor configured to sense the rotation speed of the camshaft. A driving current may be generated for controlling an output torque of a motor based on a phase deviation between the received target phase angle and the calculated actual phase angle.

In another exemplary embodiment, a control method of a continuously variable valve timing (CVVT) control device may include an intellectual motor controller implemented as one body with a motor, configured to receive an actual phase angle and a target phase angle of an intake valve or an exhaust valve from an engine controlling unit (ECU) through digital communication in a vehicle. Further, the intellectual motor controller may be configured to generate a driving current to adjust an output torque of a motor based on a phase deviation between the received actual phase angle and target phase angle.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
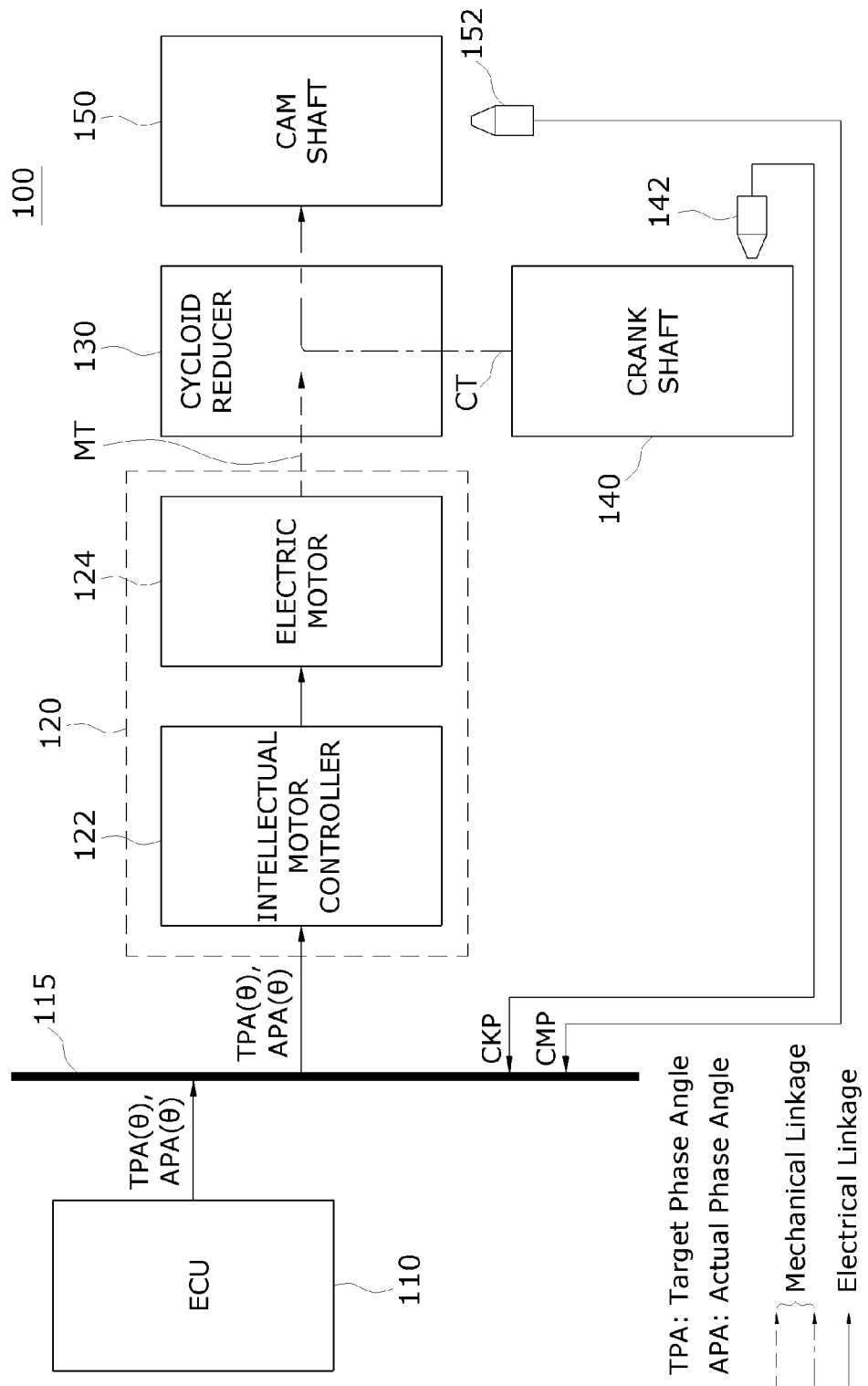
FIG. 1 is an exemplary block diagram schematically illustrating a whole configuration of a CVVT control device according to an exemplary embodiment of the present invention.

Hereinafter, the exemplary embodiment of the present invention will be described in detail with reference to the accompanying drawings to allow those skilled in the art to easily practice the present invention. Advantages and features of the present invention and methods for achieving the same will be clearly understood with reference to the following detailed description of embodiments in conjunction with the accompanying drawings. However, the present invention is not limited to the embodiments disclosed herein, but may be implemented in various different forms. The embodiments are merely given to make the disclosure of the present invention complete and to completely instruct the scope of the invention to those skilled in the art, and the present invention should be defined by the scope of the claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

The present invention provides a CVVT control device for combustion engines, may include a motor as a driving source and may be configured to adjust a relative rotation speed of the motor with respect to a rotation speed of a camshaft of a combustion engine to shift a rotation phase of the camshaft with respect to a crankshaft. Accordingly, a valve timing of an intake valve or an exhaust valve may be adjusted. The CVVT control device may include an engine controlling unit (ECU) and an intelligent motor controller that may be configured to perform digital communication with the ECU. In exemplary embodiments of the present invention, the intelligent motor controller may be configured to perform operations of a process, performed by a conventional ECU that may include calculating a command value of an electric motor to decrease an operation load of the ECU.

FIG. 1 is an exemplary block diagram schematically illustrating a whole configuration of a CVVT control device 100 according to an exemplary embodiment of the present invention. Referring to FIG. 1, the CVVT control device 100 according to an exemplary embodiment of the present invention may include an ECU 110, a motor controller module 120, a cycloid reducer 130, a crankshaft 140, a crankshaft position sensor 142, a camshaft 150 and a camshaft position sensor 152. The ECU 110 may be configured to transmit an actual phase angle APA(θ) and a target phase angle TPA(θ) of an intake valve or an exhaust valve to the motor controller module 120 via digital communication (e.g., network communication in a vehicle) in the vehicle. The digital communication may include local interconnect network (LIN) communication, controller area network (CAN) communication, FlexRay communication, media oriented systems transport (MOST) communication, Ethernet communication, 2-wire serial communication, 4-wire serial communication, or the like. For example, the serial communications may include EIA-485, TIA/EIA-485, RS-485, EIA-422, TIA-422, RS-422, or the like.

The ECU 110 may be configured to receive a pulse-type crank angle signal (CKP) that represents a rotation speed of the crankshaft 140 received from the crankshaft position sensor 142, and receive a pulse-type cam angle signal CMP that may be generated by sensing a rotation speed of the camshaft 150 from the camshaft position sensor 152. The ECU may be configured to calculate the actual phase angle APA(θ) of the intake valve or the exhaust valve based on the received crank angle signal CKP and cam angle signal CMP. The actual phase angle APA(θ) may be calculated based on a time interval between an edge of a specific pulse of the crank angle signal CKP and an edge of a specific pulse of the cam angle signal CMP.

Moreover, the ECU 110 may be configured to calculate the target phase angle TPA(θ) from a combination ratio of air and fuel necessary for combustion in an engine and an open proportion of a throttle valve measured by a throttle position sensor (TPS). For example, the combination ratio of the air and the fuel may be calculated based on a concentration of oxygen which is included in the exhaust gas of the engine and may be configured to be measured by an oxygen sensor disposed in an exhaust manifold. Although not shown, the ECU 110 may be configured to receive via the digital communication in the vehicle information related to the open proportion from the TPS and information related to the oxygen concentration from the oxygen sensor.

When the ECU 110 calculates the actual phase angle APA(θ) and the target phase angle TPA(θ), the ECU 110 may be configured to transmit the calculated actual phase angle APA(θ) and target phase angle TPA(θ) to the motor controller module 120 via a communication bus 115 of the vehicle. In particular, the communication bus 115 may be a LIN bus, a CAN bus, a FlexRay bus, a MOST bus, or an Ethernet bus for the digital communication. The related art ECU may be configured to perform operations related to calculating a command value for controlling the electric motor 124, based on the actual phase angle APA(θ) and the target phase angle TPA(θ).

However, in the present invention, the ECU 110 may be configured to transmit the calculated actual phase angle APA(θ) and target phase angle TPA(θ) to the motor controller module 120 via the digital communication. Further, the motor controller module 120 may be configured to perform a calculation of the command value, for example, calculating a phase deviation between the actual phase angle APA(θ) and the target phase angle TPA(θ), calculating a duty value for controlling an output torque of the electric motor 124 based on the calculated phase deviation, etc. Therefore, an operation load associated with CVVT control performed by the ECU 110 may be reduced.

The motor controller module 120 may be configured to receive the actual phase angle APA(θ) and the target phase angle TPA(θ) from the ECU 110 through the communication bus 115 and may be configured to generate a motor torque MT to adjust a relative rotation speed with respect to the rotation speed of the camshaft, based on the actual phase angle APA(θ) and the target phase angle TPA(θ). For example, the communication bus 115 may be a LIN bus, a CAN bus, a FlexRay bus, a MOST bus, or an Ethernet bus for the digital communication. Further, the motor controller module 120 may include an intellectual motor controller 122 and the electric motor 124. The intellectual motor controller 122 may be disposed on a surface of a housing configuring an external appearance of the motor 124. Therefore, the intellectual motor controller 122 and the electric motor 124 may be implemented as a single body. The intellectual motor controller 122 may be configured to calculate the phase deviation between the received actual phase angle APA(θ) and target phase angle TPA(θ) and may be configured to calculate a duty value to adjust a relative rotation speed of the motor 124, based on the calculated phase deviation.

Furthermore, the intellectual motor controller 122 may be configured to output a driving current that corresponds to the calculated duty value. A detailed description will be described in detail with reference to FIG. 2. The motor 124 may be configured to output the motor torque MT that corresponds to a relative rotation speed value with respect to the rotation speed of the camshaft based on the driving current output from the intellectual motor controller 122. For example, the motor 124 may be a brushless DC motor (BLDCM). The cycloid reducer 130 may be configured to transfer an output torque, obtained by subtracting a crank torque CT transferred through a chain of the crankshaft 140 from the motor torque MT transferred from the electric motor 124, to the camshaft 150 according to a reduction gear ratio (e.g., a gear ratio). The cycloid reducer 130 may be referred to as a gear box or a cam phase converter. The camshaft 150 may be configured to adjust a valve timing of the intake valve or the exhaust valve via a rotation phase which is adjusted based on the output torque transferred from the cycloid reducer 130.

Figure 2:
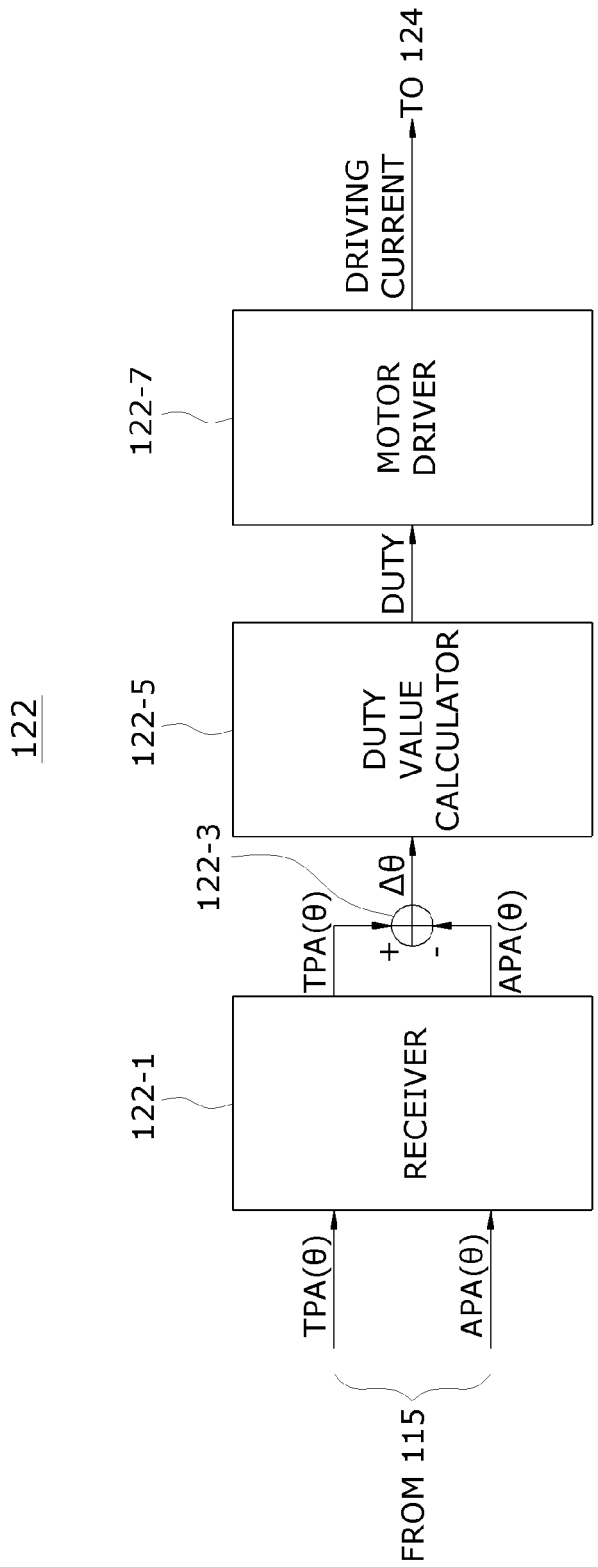
FIG. 2 is an exemplary block diagram illustrating an internal configuration of an intelligent motor controller illustrated in FIG. 1 according to an exemplary embodiment of the present invention.

FIG. 2 is an exemplary block diagram illustrating an internal configuration of an intelligent motor controller illustrated in FIG. 1. Referring to FIG. 2, the intellectual motor controller 122 may be implemented as one body (e.g., an integration type) with the BLDCM 124 and may be configured to perform a motor control operation conventionally performed by the ECU 110. In particular, the intellectual motor controller 122 may include a receiver 122-1, a subtractor 122-3, a duty value calculator 122-5, and a motor driver 122-7. The receiver 122-1 may be configured to receive the actual phase angle APA(θ) and the target phase angle TPA(θ) from the ECU 110 through the digital communication via the communication bus 115. For example, the receiver 122-1 may be a LIN communication receiver, a CAN communication receiver, a FlexRay communication receiver, a MOST communication receiver, an Ethernet communication receiver, or a serial communication receiver.

The subtractor 122-3 may be configured to receive the actual phase angle APA(θ) and the target phase angle TPA(θ) from the receiver 122-1 and may be configured to calculate a phase deviation Δθ therebetween. The duty value calculator 122-5 may be configured to calculate a torque value for subtracting or adding a torque value of the crankshaft via a control unit interval, the reduction gear ratio (or the gear ratio), and the phase deviation Δθ and may be configured to calculate a duty value DUTY that corresponds to the calculated torque value.

The output torque value MT may be calculated as expressed in the following Equation (1):

$$\Delta\theta \propto 2 \cdot CT + Z \cdot MT \cdot \varepsilon \quad (1)$$

where Δθ indicates a desired phase shift rate of the camshaft, CT indicates a crank torque, Z indicates a reduction gear ratio of the cycloid reducer, and ε indicates transmission efficiency.

The motor driver 122-9 may be configured to calculate a duty ratio that corresponds to the phase deviation Δθ from the duty value DUTY calculated by the duty value calculator 122-5, generate the driving current that corresponds to the duty ratio, and output the driving current of the electric motor 124. At least one of a rotation direction, a rotation speed, and a torque of the electric motor 124 may be controlled based on the driving current. As described above, when an operation load associated with CVVT control conventionally performed by the ECU is distributed to the intellectual motor controller 122, an operation load of the ECU 110 may be reduced.

Figure 3:
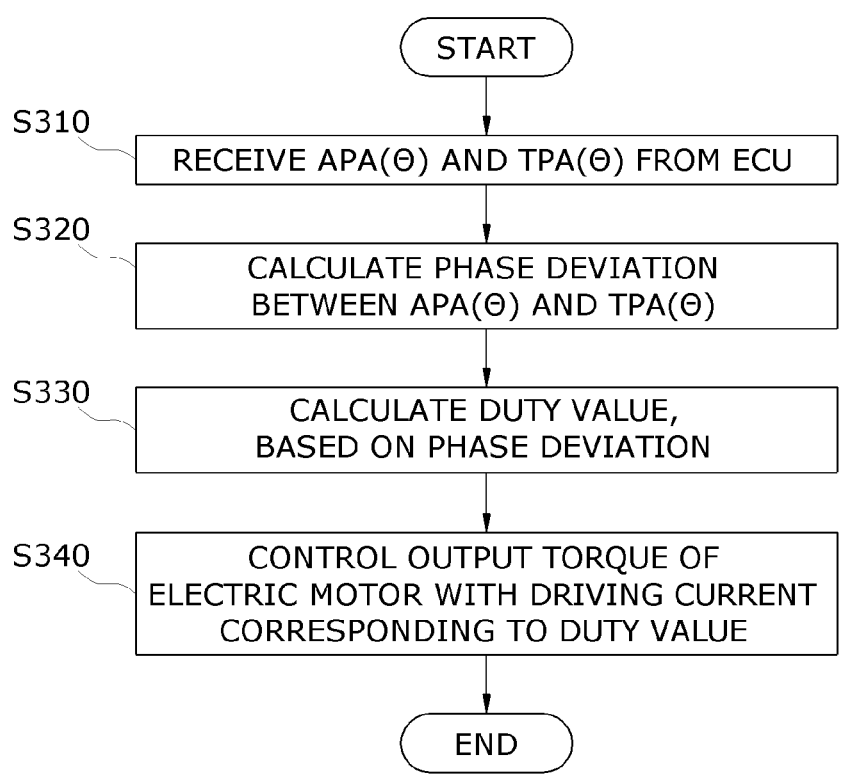
FIG. 3 is an exemplary flowchart illustrating a CVVT control method according to an exemplary embodiment of the present invention.

FIG. 3 is an exemplary flowchart illustrating a CVVT control method according to an embodiment of the present invention. Referring to FIG. 3, the intellectual motor controller 122 implemented as one body with the electric motor 124 may be configured to receive the actual phase angle APA(θ) and the target phase angle TPA(θ) from the ECU 110 S310. The ECU 110 and the intellectual motor controller 122 may be connected to each other through the digital communication, for receiving the actual phase angle APA(θ) and the target phase angle TPA(θ).

The digital communication may be at least one of LIN communication, CAN communication, FlexRay communication, MOST communication, Ethernet communication, 2-wire serial communication, and 4-wire serial communication. The intellectual motor controller 122 may be configured to calculate the phase deviation Δθ between the received actual phase angle APA(θ) and target phase angle TPA(θ) S320. The intellectual motor controller 122 may be configured to calculate a duty value DUTY for adjusting the output torque of the electric motor 124, based on the phase deviation S330. The motor driver 122-9 may be configured to generate a driving current corresponding to the duty value DUTY calculated by the intellectual motor controller 122 and may output the generated driving current of the electric motor 124 S340. Then, the electric motor 124 may be configured to transfer a motor torque, based on a rotation direction and a rotation speed of a rotor that corresponds to the driving current, to the cycloid reducer 130.

As described above, the related art ECU performs operations of calculating a command value for controlling the electric motor 124, based on the actual phase angle APA(θ) and the target phase angle TPA(θ). However, in the present invention, the ECU 110 may be configured to transmit the calculated actual phase angle APA(θ) and target phase angle TPA(θ) to the motor controller module 120 through the digital communication, however, the motor controller module 120 may be configured to perform calculating the command value, for example, calculating a phase deviation between the actual phase angle APA(θ) and the target phase angle TPA(θ) and calculating a duty value for controlling an output torque of the electric motor 124 by using the calculated phase deviation, etc. Therefore, an operation load associated with CVVT control performed by the ECU 110 may be reduced.

Figure 4:
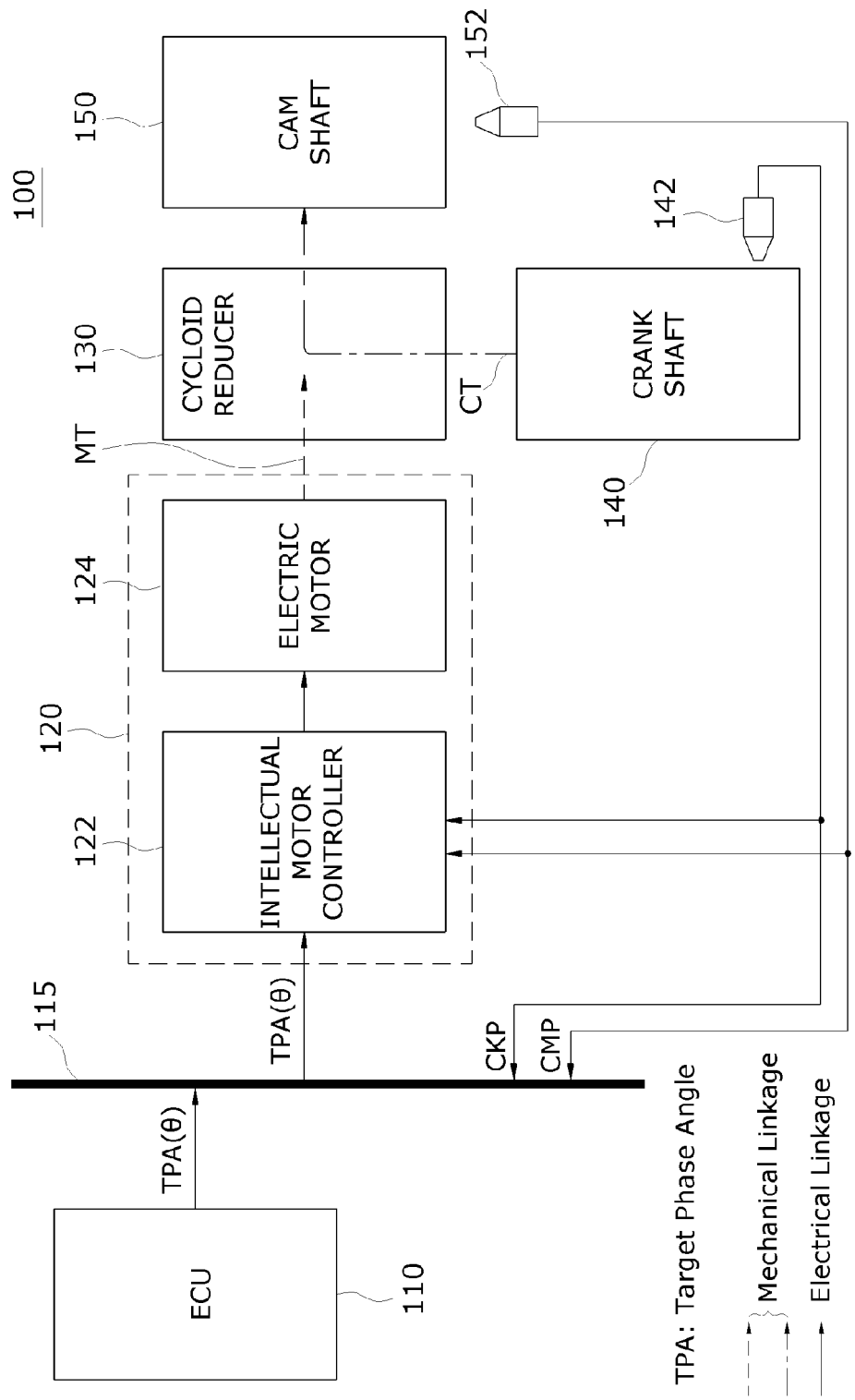
FIG. 4 is an exemplary block diagram schematically illustrating a whole configuration of a CVVT control device according to an exemplary embodiment of the present invention.

FIG. 4 is an exemplary block diagram schematically illustrating a whole configuration of a CVVT control device according to an exemplary embodiment of the present invention. Referring to FIG. 4, an intellectual motor controller 122 according to an exemplary embodiment of the present invention may receive a target phase angle TPA(θ) from an ECU 110 through digital communication and may be configured to autonomously calculate an actual phase angle APA(θ). In other words, the intellectual motor controller 122 according to an exemplary embodiment of the present invention may directly receive a crank angle signal CKP from a crankshaft position sensor 142 and a cam angle signal CMP from a camshaft position sensor 152 through wired communication, thereby may be configured to autonomously calculating the actual phase angle APA(θ). Therefore, instead of the ECU 110, the intellectual motor controller 122 according to an exemplary embodiment of the present invention may be configured to perform a calculation of the actual phase angle APA(θ) in addition to an operation of calculating a phase deviation Δθ between the actual phase angle APA(θ) and the target phase angle TPA(θ) and may be configured to perform a calculation of a duty value DUTY to adjust an output torque of the electric motor 124, to decrease an operation load added to the ECU 110.

Figure 5:
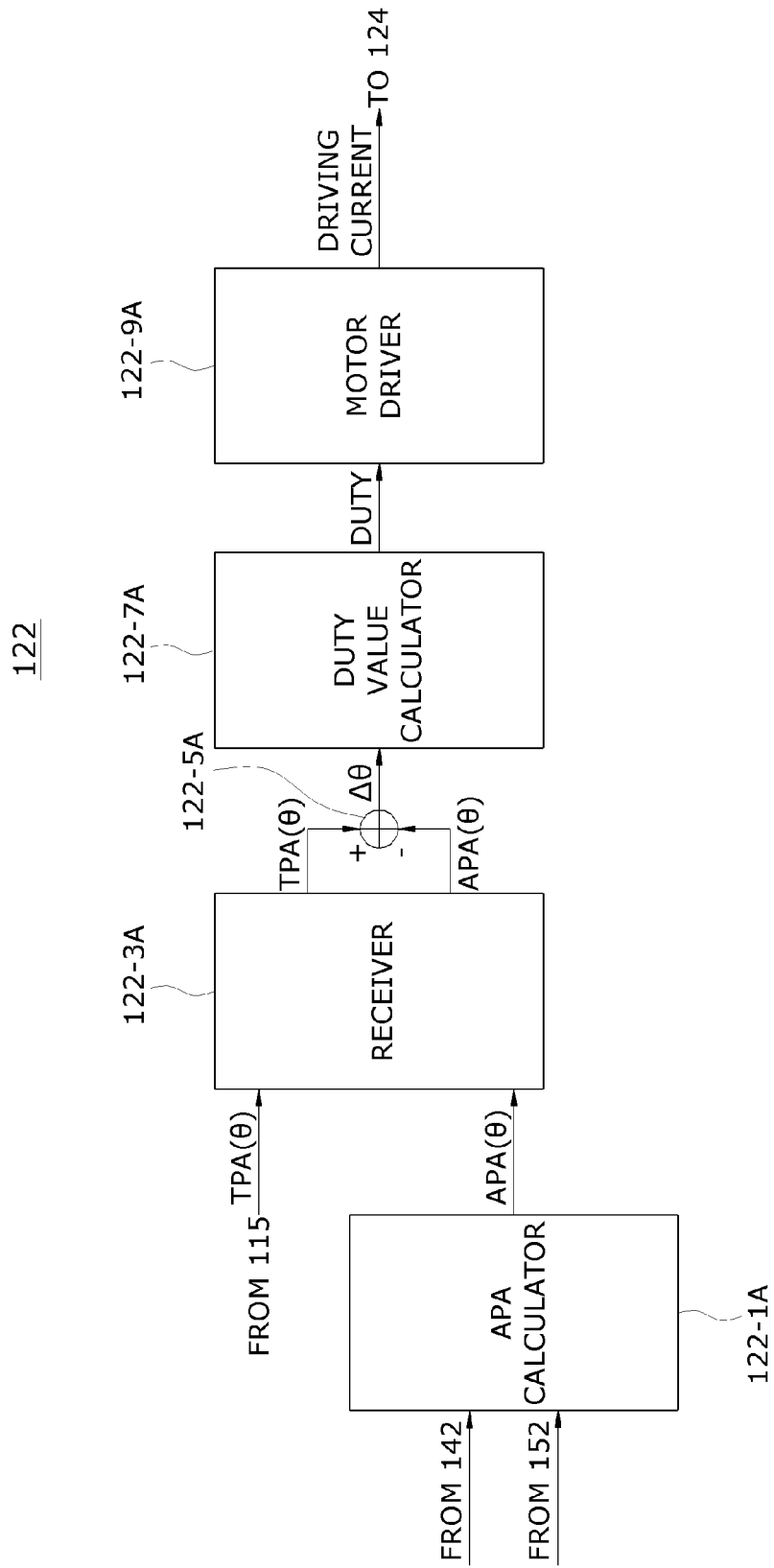
FIG. 5 is an exemplary block diagram illustrating an internal configuration of an intelligent motor controller illustrated in FIG. 4 according to an exemplary embodiment of the present invention.

FIG. 5 is an exemplary block diagram illustrating an internal configuration of an intelligent motor controller illustrated in FIG. 4. Referring to FIG. 5, the intellectual motor controller 122 according to an exemplary embodiment of the present invention may include an APA calculator 122-1A, a receiver 122-3A, a subtractor 122-5A, a duty value calculator 122-7A, and a motor driver 122-9A. The elements 122-5A, 122-7A and 122-9A other than the APA calculator 122-1A and the receiver 122-3A may be configured to respectively perform the same functions as those of the elements 122-3, 122-5 and 122-7 illustrated in FIG. 2. Therefore, the respective descriptions of the elements 122-3, 122-5 and 122-7 illustrated in FIG. 2 may be applied to the elements 122-5A, 122-7A and 122-9A.

The APA calculator 122-1A may directly receive the crank angle signal CKP from the crankshaft position sensor 142 and the cam angle signal CMP from the camshaft position sensor 152 through the wired communication. The APA calculator 122-1A may be configured to calculate the actual phase angle APA(θ) based on a time difference between an edge of a specific pulse of the crank angle signal CKP and an edge of a specific pulse of the cam angle signal CMP.

The actual phase angle APA(θ) calculated by the APA calculator 122-1A may be configured to be transferred to the subtractor 122-5A via the receiver 122-3A. Although not shown, the actual phase angle APA(θ) calculated by the APA calculator 122-1A may be configured to be directly be transferred to the subtractor 122-5A without passing through the receiver 122-3A. Operations respectively performed by the APA calculator 122-1A, the duty value calculator 122-7A, and the motor driver 122-9A may be the operations respectively performed by the subtractor 122-3, the duty value calculator 122-5, and the motor driver 122-7 illustrated in FIG. 3, and thus, their detailed descriptions are omitted.

Figure 6:
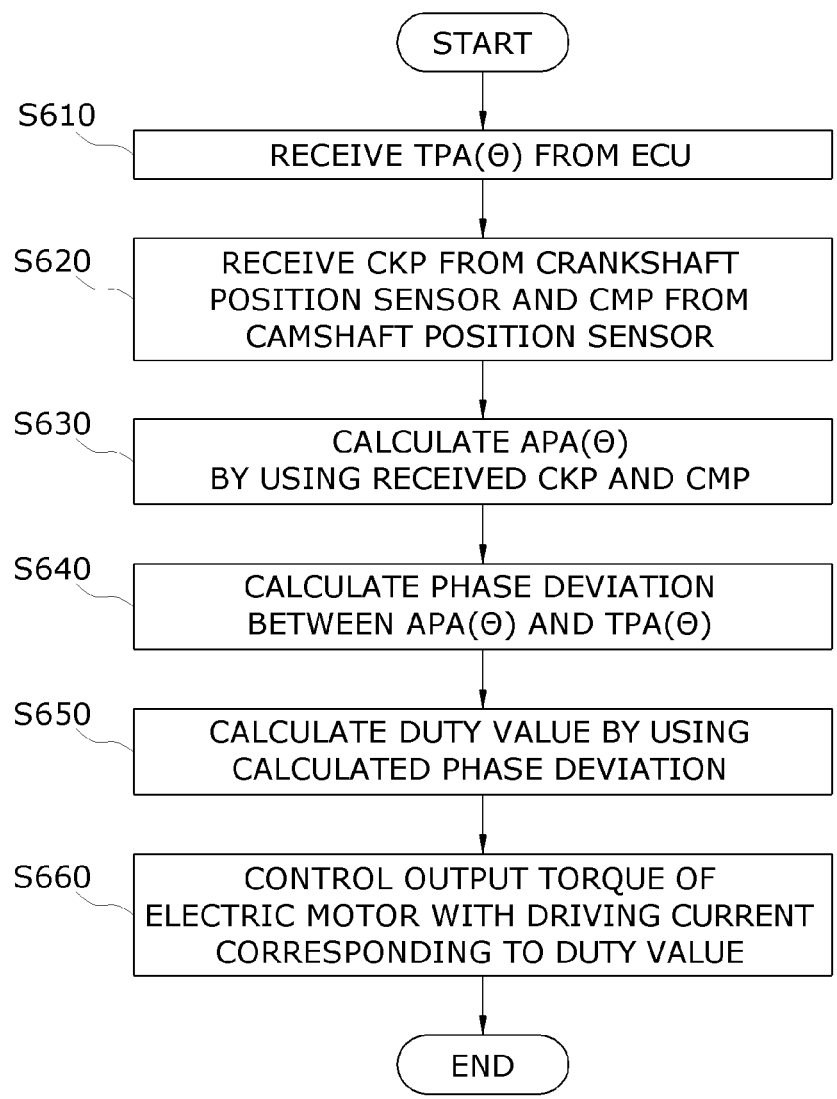
FIG. 6 is an exemplary flowchart illustrating a CVVT control method according to another exemplary embodiment of the present invention.

FIG. 6 is an exemplary flowchart illustrating a CVVT control method according to an exemplary embodiment of the present invention. Referring to FIG. 6, the intellectual motor controller 122 may be configured to receive the target phase angle TPA(θ) from the ECU 110 through digital communication S610. The intellectual motor controller 122 may be configured to wiredly receive the crank angle signal CKP from the crankshaft position sensor 142 and the cam angle signal CMP from the camshaft position sensor 152 S620. The intellectual motor controller 122 may be configured to calculate the actual phase angle APA(θ) based on the crank angle signal CKP and the cam angle signal CMP S630.

Further, the intellectual motor controller 122 may be configured to calculate the phase deviation Δθ between the calculated actual phase angle APA(θ) and the target phase angle TPA(θ) received from the ECU 110 S640. The intellectual motor controller 122 may be configured to calculate a duty value based on the calculated phase deviation Δθ S650. The intellectual motor controller 122 may be configured to control the output torque of the electric motor 124 with the driving current that corresponds to the calculated duty value S660.

As described above, the related art ECU performs all operations of calculating a command value for controlling the electric motor 124, based on the actual phase angle APA(θ) and the target phase angle TPA(θ). However, in the present invention, the ECU 110 may be configured to transmit the calculated actual phase angle APA(θ) and target phase angle TPA(θ) to the motor controller module 120 through the digital communication, however, the motor controller module 120 may be configured to perform a calculation of the command value, for example, calculating a phase deviation between the actual phase angle APA(θ) and the target phase angle TPA(θ), or calculating a duty value for controlling an output torque of the electric motor 124 based on the calculated phase deviation, etc. Therefore, an operation load associated with CVVT control performed by the ECU 110 may be reduced.

According to the present invention, in the CVVT system, the intelligent motor controller implemented as one body with an electric motor may perform some operations performed by a conventional ECU for controlling a motor, thereby decreasing an operation load performed by the conventional ECU.

As the present invention may be embodied in several forms without departing from the spirit or essential characteristics thereof, it should also be understood that the above-described exemplary embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A continuously variable valve timing (CVVT) control device for combustion engines, comprising:
    a motor configured to provide a driving source and adjust a relative rotation speed of the motor with respect to a rotation speed of a camshaft of a combustion engine, wherein the camshaft includes a rotational phase that is configured to shift with respect to a crankshaft and adjust a valve timing of an intake valve or an exhaust valve;
    an engine controlling unit (ECU) configured to output an actual phase angle and a target phase angle of the intake valve or the exhaust valve; and
    an intellectual motor controller configured to receive the actual phase angle and the target phase angle from the ECU through digital communication in a vehicle and generate a driving current to adjust an output torque of the motor based on a phase deviation between the received actual phase angle and target phase angle.

2. The CVVT control device of claim 1, wherein the digital communication includes at least one selected from the group consisting of: local interconnect network (LIN) communication, controller area network (CAN) communication, FlexRay communication, media oriented systems transport (MOST) communication, Ethernet communication, 2-wire serial communication, and 4-wire serial communication.

3. The CVVT control device of claim 1, wherein the digital communication includes 2-wire serial communication or 4-wire serial communication, each of which includes at least one selected from the group consisting of: EIA-485, TIA/EIA-485, RS-485, EIA-422, TIA-422, and RS-422.

4. The CVVT control device of claim 1, further comprising: a communication bus that connects the ECU to the intellectual motor controller through the digital communication in the vehicle,
    wherein the communication bus includes at least one selected from a group consisting of: a local interconnect network (LIN) communication bus, a controller area network (CAN) communication bus, a FlexRay communication bus, a media oriented systems transport (MOST) communication bus, an Ethernet communication bus, and a serial communication bus.

5. The CVVT control device of claim 1, wherein the intellectual motor controller is configured to:
    receive, by a receiver of the intellectual motor controller, the actual phase angle and the target phase angle output from the ECU through the digital communication in the vehicle;
    calculate the phase deviation between the actual phase angle and the target phase angle;
    calculate a torque value of the crankshaft based on the calculated phase deviation and calculate a duty value that corresponds to the calculated torque value; and
    output a driving current that corresponds to the calculated duty value to the motor.

6. The CVVT control device of claim 5, wherein the receiver includes at least one selected from a group consisting of: a local interconnect network (LIN) communication receiver, a controller area network (CAN) communication receiver, a FlexRay communication receiver, a media oriented systems transport (MOST) communication receiver, an Ethernet communication receiver, and a serial communication receiver.

7. The CVVT control device of claim 1, wherein the intellectual motor controller is disposed on a surface of a housing configuring an external appearance of the motor and is implemented as one body with the motor.

8. A continuously variable valve timing (CVVT) control device for combustion engines, comprising:
    a motor configured as a driving source that adjusts a relative rotation speed of the motor with respect to a rotation speed of a camshaft of a combustion engine, wherein the camshaft is configured to adjust a rotation phase with respect to a crankshaft to adjust a valve timing of an intake valve or an exhaust valve;
    an engine controlling unit (ECU) configured to output a target phase angle of the intake valve or the exhaust valve; and
    an intellectual motor controller configured to receive the target phase angle from the ECU through digital communication in a vehicle, calculate an actual phase angle by using a crank angle signal received from a crankshaft position sensor sensing a rotation speed of the crankshaft and a cam angle signal received from a camshaft position sensor sensing the rotation speed of the camshaft, and generate a driving current for controlling an output torque of the motor by using a phase deviation between the received target phase angle and the calculated actual phase angle.

9. The CVVT control device of claim 8, wherein the digital communication includes at least one selected from a group consisting of: local interconnect network (LIN) communication, controller area network (CAN) communication, FlexRay communication, media oriented systems transport (MOST) communication, Ethernet communication, 2-wire serial communication, and 4-wire serial communication.

10. The CVVT control device of claim 8, further comprising: a communication bus that connects the ECU to the intellectual motor controller through the digital communication in the vehicle,
    wherein the communication bus includes at least one selected from a group consisting of: a local interconnect network (LIN) communication bus, a controller area network (CAN) communication bus, a FlexRay communication bus, a media oriented systems transport (MOST) communication bus, an Ethernet communication bus, and a serial communication bus.

11. The CVVT control device of claim 8, wherein the intellectual motor controller is configured to:
calculate the actual phase angle from a time difference between an edge of a specific pulse of the crank angle signal and an edge of a specific pulse of the cam angle signal;
receive, by a receiver of the intellectual motor controller, the target phase angle output from the ECU through the digital communication in the vehicle;
calculate the phase deviation between the target phase angle and the actual phase angle;
calculate a torque value of the crankshaft based on the calculated phase deviation and calculate a duty value that corresponds to the calculated torque value; and
output a driving current that corresponds to the calculated duty value to the motor.

12. The CVVT control device of claim 11, wherein the receiver includes at least one selected from a group consisting of: a local interconnect network (LIN) communication receiver, a controller area network (CAN) communication receiver, a FlexRay communication receiver, a media oriented systems transport (MOST) communication receiver, an Ethernet communication receiver, and a serial communication receiver.

13. A control method of a continuously variable valve timing (CVVT) control device for combustion engines comprising:
adjusting a relative rotation speed of a motor used as a driving source with respect to a rotation speed of a camshaft of a combustion engine to shift a rotation phase of the camshaft with respect to a crankshaft;
adjusting a valve timing of an intake valve or an exhaust valve;
receiving, by an intellectual motor controller, an actual phase angle and a target phase angle of the intake valve or the exhaust valve from an engine controlling unit (ECU) through digital communication in a vehicle, the intellectual motor controller being implemented as one body with the motor; and
generating, by the intellectual motor controller, a driving current for adjusting an output torque of the motor based on a phase deviation between the received actual phase angle and target phase angle.

14. The control method of claim 13, wherein in the receiving, the digital communication includes at least one selected from a group consisting of: local interconnect network (LIN) communication, controller area network (CAN) communication, FlexRay communication, media oriented systems transport (MOST) communication, Ethernet communication, 2-wire serial communication, and 4-wire serial communication.

15. The control method of claim 13, wherein the intellectual motor controller is configured to:
calculate the phase deviation between the actual phase angle and the target phase angle;
calculate a torque value of the crankshaft based on the calculated phase deviation and calculate a duty value that corresponds to the calculated torque value; and
generate a driving current that corresponds to the calculated duty value.

* * * * *